US010506012B2

(12) United States Patent
Lee (10) Patent No.: US 10,506,012 B2
(45) Date of Patent: Dec. 10, 2019

(54) ADDING AND REMOVING VIRTUAL DISKS REMOTELY TO A STREAMING MACHINE (71) Applicant: Citrix Systems, Inc., Burlington, MA (US)

(72) Inventor: Moso Lee, Nashua, NH (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 223 days.

(21) Appl. No.: 15/158,913

(22) Filed: May 19, 2016

(65) Prior Publication Data
US 2017/0339223 A1 Nov. 23, 2017

(51) Int. Cl.
H04L 29/06 (2006.01)
G06F 9/455 (2018.01)
H04L 29/08 (2006.01)
G06F 9/4401 (2018.01)
H04L 12/46 (2006.01)
G06F 3/06 (2006.01)

(52) U.S. Cl.
CPC .......... *H04L 65/608* (2013.01); *G06F 3/0607* (2013.01); *G06F 3/067* (2013.01); *G06F 3/0632* (2013.01); *G06F 3/0674* (2013.01); *G06F 9/45558* (2013.01); *H04L 12/4675* (2013.01); *G06F 9/4413* (2013.01); *G06F 2009/45579* (2013.01); *G06F 2009/45583* (2013.01); *H04L 67/1097* (2013.01)

(58) Field of Classification Search
CPC ....................... H04L 67/1095; H04L 12/4675; H04L 65/608
USPC ......................................................... 709/226
See application file for complete search history.

(56) References Cited

U.S. PATENT DOCUMENTS 9,158,561 B2* 10/2015 Conover .................... G06F 8/65
2003/0200290 A1* 10/2003 Zimmerman ......... G06F 9/4416
709/222
2005/0138348 A1* 6/2005 Bolay ................. G06F 9/44505
713/100
2005/0160150 A1* 7/2005 Kao ....................... G06F 3/0605
709/212

(Continued)

OTHER PUBLICATIONS

"VMware App Volumes User's Guide", 2014, VMware, VMware App vols. 2.5, all pages, https://www.vmware.com/pdf/app-volumes-user-guide.pdf (Year: 2014).*

(Continued)

*Primary Examiner* — Patrice L Winder
*Assistant Examiner* — Lam H Duong
(74) *Attorney, Agent, or Firm* — Allen, Dyer, Doppelt + Gilchrist, PA (57) ABSTRACT A client device includes a memory and a processor cooperating therewith to boot the client device and connect to a provisioning server via a network. The processor receives a streaming virtual disk image from the provisioning server based on a virtual disk configuration, receives a virtual disk change notification from the provisioning server, and determines changes to the virtual disk configuration based on the virtual disk change notification. The memory and the processor cooperate with the provisioning server to change the streaming virtual disk image based on the determined changes to the virtual disk configuration and without rebooting the client device.

21 Claims, 7 Drawing Sheets (56) References Cited

U.S. PATENT DOCUMENTS

| | | | | |
|---|---|---|---|---|
| 2006/0031547 | A1* | 2/2006 | Tsui | G06F 9/4416 |
| | | | | 709/231 |
| 2007/0276966 | A1* | 11/2007 | Paul | G06F 9/4411 |
| | | | | 710/8 |
| 2010/0088699 | A1* | 4/2010 | Sasaki | G06F 8/63 |
| | | | | 718/1 |
| 2010/0174894 | A1* | 7/2010 | Chen | G06F 9/4416 |
| | | | | 713/2 |
| 2012/0297181 | A1 | 11/2012 | Lee | |
| 2013/0174158 | A1* | 7/2013 | Lee | G06F 9/4416 |
| | | | | 718/1 |
| 2015/0160877 | A1 | 6/2015 | Larkin et al. | |
| 2015/0207879 | A1* | 7/2015 | Conover | G06F 9/45558 |
| | | | | 709/216 |
| 2015/0309783 | A1* | 10/2015 | Labana | G06F 8/65 |
| | | | | 717/168 |
| 2016/0359981 | A1* | 12/2016 | Ulatoski | H04L 63/08 |
| 2017/0315833 | A1* | 11/2017 | Vajravel | G06F 9/45558 |

OTHER PUBLICATIONS

"VMware App Volumes Deployment Guide", 2015, VMware, VMware App vols. 2.5 Technical White Paper, all pages, https://vdr.one/wp-content/uploads/2015/12/vmware-horizon-view-app-volumes-deployment-guide.pdf (Year: 2015).*

* cited by examiner

ADDING AND REMOVING VIRTUAL DISKS REMOTELY TO A STREAMING MACHINE

FIELD OF THE INVENTION

The present invention relates to computer virtualization, and more particularly, to delivering multiple virtual disks to a streaming provisioning endpoint.

BACKGROUND OF THE INVENTION

In an environment for centralized management of desktops, multiple client machines may receive access to or execute a computing environment based on copies of a single "golden master" desktop disk image. A machine disk image or desktop disk image may be an image of an operating system (OS), and may include sets of applications and customizations representing a working environment for a user.

In some environments, a machine image includes files used to execute a client machine that then executes an operating system or other user applications. In other environments, a desktop image includes files used to execute an operating system or other user applications, and either a physical machine or a virtual machine may execute the desktop image. An image of a machine or desktop may be generally referred to as a base disk image. The base image disk may also be referred to as a virtual image disk and is based on a virtual disk configuration.

Current machine streaming provisioning is limited to streaming one virtual disk image at a time. The one virtual disk image includes the operating system, applications data and user settings.

A virtual disk assignment change to the operating system, applications data or user settings effects the entire virtual disk and requires a reboot at the client device. For a customer to prepare a golden image of their client device the virtual disk needs to have the latest operating system update, and the latest applications data update all together. This presents a burden to the customer since there is no flexibility in separating the operating system, applications data and user data within a single virtual disk.

In a virtual machine, it is common practice to enumerate a virtual disk with the assistance of a hypervisor. A virtual disk can surface to a virtual machine through a hypervisor management backend. However, there are several shortcomings. One shortcoming is that remote adding and removing a virtual disk does not apply to a physical machine. Another shortcoming is that the virtual disk file needs to be distributed completely in hypervisor storage before the virtual disk can be presented to the virtual machine, which could incur a long wait time.

SUMMARY OF THE INVENTION

A remote plug-and-play mechanism is provided to add and remove virtual disks to a provisioned machine without remote end-point interaction and without requiring a hypervisor.

A client device comprises at least one memory and a processor cooperating therewith to boot the client device and connect to a provisioning server via a network, receive a streaming virtual disk image from the provisioning server based on a virtual disk configuration, and receive a virtual disk change notification from the provisioning server. The processor may determine changes to the virtual disk configuration based on the virtual disk change notification, and cooperate with the provisioning server to change the streaming virtual disk image based on the determined changes to the virtual disk configuration and without rebooting the client device.

When multiple virtual disks are being streamed to the client device, this advantageously allows the virtual disks to be used for different purposes. For example, instead of having the operating system, the application data and user data all in the same virtual disk, now a separate virtual disk may be provided for each of these areas.

In one embodiment, the virtual disk configuration may comprise at least one virtual disk, and the determined changes to the virtual disk configuration may comprise adding an additional virtual disk.

In another embodiment, the virtual disk configuration may comprise a plurality of virtual disks, and the determined changes to the virtual disk configuration may comprise removing one of the plurality of virtual disks.

This remote plug-and-play mechanism allows virtual disks to be added and removed on a live running machine, both physical and virtual, without the requirement of a hypervisor and without user intervention. The remote plug-and-play mechanism delivers multiple virtual disks without long wait times and without file copying.

With the remote remote plug-and-play mechanism permitting multiple virtual disks to be streamed concurrently, this advantageously allows an operating system virtual disk and an application data virtual disk to be managed separately, for example. The operating system and the application data may now each have separate update schedules.

Typically, an administrator is limited to a single golden image for both the operating system and the application data. This presented challenges when the operating system and the application data had different update schedules. The remote plug-and-play mechanism provides a flexible way in managing different virtual disks update cycles.

Another aspect is directed to a method for operating a client device as described above. The method may comprise booting the client device and connecting the client device to a provisioning server via a network; streaming a virtual disk image from the provisioning server based on a virtual disk configuration; receiving a virtual disk change notification from the provisioning server; determining changes to the virtual disk configuration based on the virtual disk change notification; and cooperating with the provisioning server to change the streaming virtual disk image based on the determined changes to the virtual disk configuration and without rebooting the client device.

Yet another aspect is directed to a non-transitory computer readable medium having a plurality of computer executable instructions for causing a client device to perform steps as also described above. The client device may boot the client device and connect to a provisioning server via a network; receive a streaming virtual disk image from the provisioning server based on a virtual disk configuration; receive a virtual disk change notification from the provisioning server, determine changes to the virtual disk configuration based on the virtual disk change notification; and cooperating with the provisioning server to change the streaming virtual disk image based on the determined changes to the virtual disk configuration and without rebooting the client device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
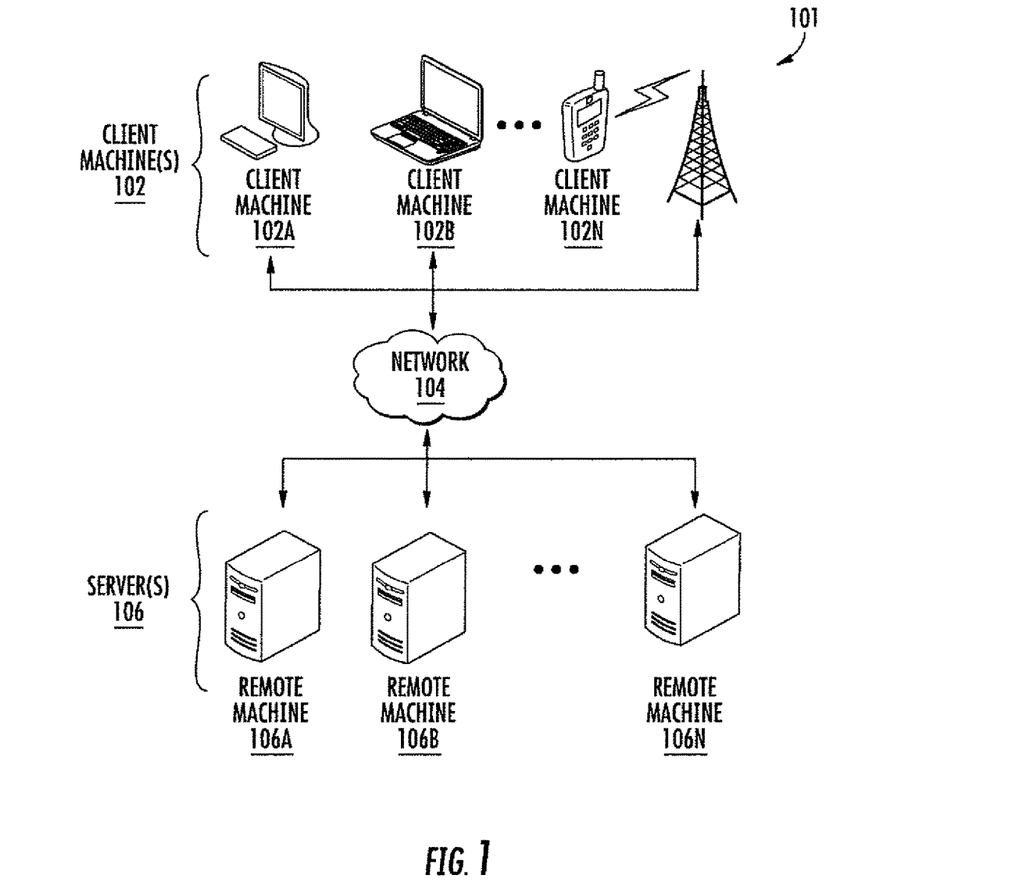
FIG. 1 is a block diagram of a network environment of computing devices in which various aspects of the disclosure may be implemented.

Referring now to FIG. 1, a non-limiting network environment 101 in which various aspects of the disclosure may be implemented includes one or more client machines 102A-102N in communications with one or more remote machines 106A-106N via one or more networks 104.

The client machines 102A-102N may be generally referred to as client machines 102, local machines 102, clients 102, client nodes 102, client computers 102, client devices 102, endpoints 102, or endpoint nodes 102. The remote machines 106A-106N may be generally referred to herein as servers 106 or a server farm 106. In some embodiments, a client machine 102 may have the capacity to function as both a client node seeking access to resources provided by a server 106 and as a server 106 providing access to hosted resources for other client machines 102A-102N.

In one embodiment, the client machine 102 may be a virtual machine. The virtual machine may be managed by, for example, a hypervisor, a virtual machine manager (VMM), or any other hardware virtualization technique.

In some embodiments, the client machine 102 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still, other embodiments may include a client device 102 that displays application output generated by an application remotely executing on a server 106 or other remotely located machine. In these embodiments, the client device 102 may display the application output in an application window, a browser, or other output window. In one embodiment, the application may be a desktop, while in other embodiments the application may be an application that generates a desktop.

In some embodiments, a server 106 may execute a remote presentation client or other client or program that uses a thin-client or remote-display protocol to capture display output generated by an application executing on a server 106 and transmits the application display output to a remote client 102.

In some embodiments, the computing environment may include more than one remote machine 106A-106N logically grouped together into a server farm 106. The server farm 106 may include servers 106 that are geographically dispersed and logically grouped together in a server farm 106, or servers 106 that are located proximate to each other and logically grouped together. The logical group of remote machines 106A-106N may be referred to as a server farm 106.

In some instances, the remote machines 106A-106N of each server farm 106 may be geographically dispersed. Geographically dispersed servers 106A-106N within a server farm 106 may, in some embodiments, communicate using a wide area network (WAN), a metropolitan area network (MAN), or a local area network (LAN), where different geographic regions may be characterized as: different continents; different regions of a continent; different countries; different states; different cities; different campuses; different rooms; or any combination of geographical locations.

In some embodiments, the server farm 106 may be administered as a single entity, while in other embodiments the server farm 106 may include multiple server farms 106. In some embodiments, the server farm 106 may include servers 106 that execute a substantially similar type of operating system platform.

In other embodiments, the remote machines 106 within each server farm 106 may be heterogeneous. For example, the server farm 106 may include a first group of servers 106 that execute a first type of operating system platform, and a second group of servers 106 that execute a second type of operating system platform. The server farm 106, in other embodiments, may include servers 106 that execute different types of operating system platforms.

A remote machine 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; an application server or as a master application server; a server 106 executing an active directory; or a server 106 executing an application acceleration program that provides firewall functionality, application functionality, or load balancing functionality.

In some embodiments, a server 106 may be a RADIUS server that includes a remote authentication dial-in user service. In still other embodiments, a remote machine 106 is a blade server. In yet other embodiments, a remote machine 106 executes a virtual machine providing, to a user or client computer 102, access to a computing environment.

Some embodiments include a first server 106A that receives requests from a client machine 102, forwards the request to a second server 106B, and responds to the request generated by the client machine 102 with a response from the second server 106B. The first server 106A may acquire an enumeration of applications available to the client machine 102 and well as address information associated with an application server 106 hosting an application identified within the enumeration of applications. The first server 106A may then present a response to the client's request using a web interface, and communicate directly with the client 102 to provide the client 102 with access to an identified application.

The remote machine 106 or server farm 106 may, in some embodiments, execute any one of the following applications: a thin-client application using a thin-client protocol to transmit application display data to a client; or a remote display presentation application. Another embodiment includes a server 106 that is an application server such as: an email server that provides email services; a web or Internet server; a desktop sharing server; a collaboration server; or any other type of application server. Still other embodiments include a server 106 that executes a hosted server application, such as a remote meeting or desktop sharing application.

In some embodiments, a remote machine 106 may execute an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

A client machine 102 may be, for example, a client node that seeks access to resources provided by a server 106. In other embodiments, the server 106 may provide clients 102 or client nodes with access to hosted resources. The server 106, in some embodiments, may function as a master node such that it communicates with one or more clients 102 or servers 106. In some embodiments, the master node may identify and provide address information associated with a server 106 hosting a requested application, to one or more clients 102 or servers 106. In still other embodiments, the master node may be a server farm 106, a client 102, a cluster of client nodes 102, or an appliance.

In some embodiments, a client 102 may communicate directly with one of the remote machines 106 in a server farm 106. In another embodiment, the client 102 executes a program neighborhood application to communicate with a remote machine 106 in a server farm 106. In still another embodiment, the remote machine 106 may provide the functionality of a master node. In some embodiments, the client 102 may communicate with the remote machine 106 in the server farm 106 through a network 104.

Over the network 104, the client 102 may, for example, request execution of various applications hosted by the remote machines 106A-106N in the server farm 106 and receive output of the results of the application execution for display. In some embodiments, only the master node provides the functionality required to identify and provide address information associated with a remote machine 106B hosting a requested application.

In one embodiment, the remote machine 106 may provide the functionality of a web server. In another embodiment, the remote machine 106A may receive requests from the client 102, forwards the requests to a second remote machine 106B and responds to the request by the client 102 with a response to the request from the remote machine 106B. In still another embodiment, the remote machine 106A acquires an enumeration of applications available to the client 102 and address information associated with a remote machine 106B hosting an application identified by the enumeration of applications.

In yet another embodiment, the remote machine 106 may present the response to the request to the client 102 using a web interface. In one embodiment, the client 102 may communicate directly with the remote machine 106 to access the identified application. In another embodiment, the client 102 may receive output data, such as display data, generated by an execution of the identified application on the remote machine 106.

One or more client machines 102, one or more servers 106, or both may transmit data over one or more networks 104 installed between machines and appliances within the computing environment 101. The network 104 may comprise one or more sub-networks, and may be installed between any combination of the clients 102, servers 106, computing machines and appliances included within the computing environment 101.

In some embodiments, the network 104 may be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104.

Still further embodiments include a network 104 that may be any of the following network types: a point to point network; a broadcast network; a telecommunications network; a data communication network; a computer network; an Asynchronous Transfer Mode (ATM) network; a Synchronous Optical Network (SONET) network; a Synchronous Digital Hierarchy (SDH) network; a wireless network; a wireline network; or a network 104 that includes a wireless link where the wireless link may be an infrared channel or satellite band.

The network topology of the network 104 may differ within different embodiments. Possible network topologies include: a bus network topology; a star network topology; a ring network topology; a repeater-based network topology; or a tiered-star network topology.

Additional embodiments may include a network 104 of mobile telephone networks that use a protocol to communicate among mobile devices, where the protocol may be any one of the following: Advanced Mobile Phone System (AMPS); Time Division Multiple Access (TDMA); Code Division Multiple Access (CDMA); Global System for Mobile Communications (GSM); General Packet Radio Service (GPRS); Universal Mobile Telecommunications System (UMTS); Evolution-Data Optimized (EV-DO); Long Term Evolution (LTE); or any other protocol able to transmit data among mobile devices like 802.11, Bluetooth, and Near Field Communication.

Although FIG. 1 shows a network 104 between the client machines 102 and remote machines 106, there may be multiple networks 104 between the client machines 102 and the remote machines 106. In one of these embodiments, the network 104 may be a private network or a public network. In another of these embodiments, the network 104 may be a private network and a public network. In still another embodiment, the network 104 may be multiple private networks. Additional networks are not shown in FIG. 1 to avoid overcomplicating the drawing.

Figure 2:
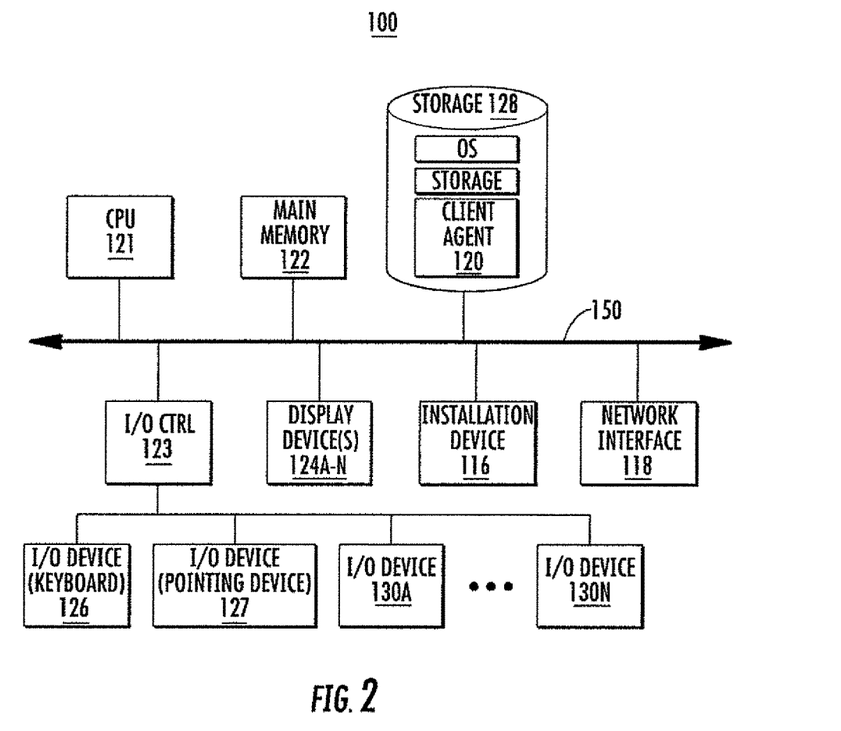
FIGS. 2 and 3 are block diagrams of computing devices useful for practicing an embodiment of the client machines or the servers illustrated in FIG. 1.
Figure 3:
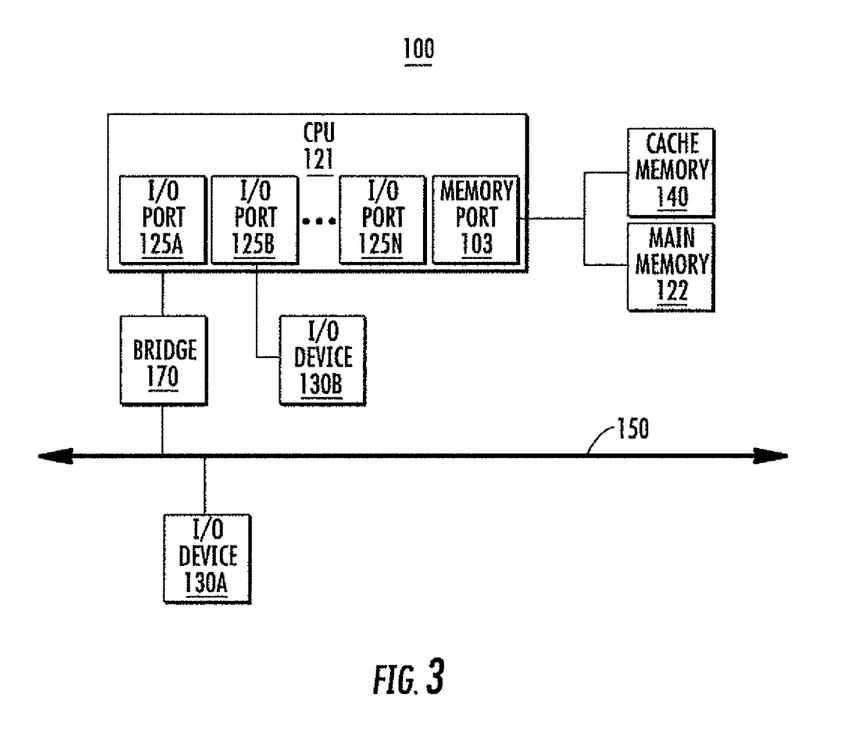

FIGS. 2 and 3 depict block diagrams of a computing device 100 useful for practicing an embodiment of the client machines 102 or the servers 106. Each computing device 100 includes a central processing unit 121 and at least one memory 122, 140 coupled thereto. Additional descriptions of client machines 102 and remote machines 106 and operation thereof may be found in U.S. published patent application no. 2012/0297181, which is incorporated herein by reference in its entirety. The '181 application is assigned to the current assignee of the present disclosure.

FIG. 2 depicts an embodiment of a computing device 100 in which the processor 121 communicates with main memory 122 via a system bus 150. FIG. 3 depicts an embodiment of a computing device 100 in which the processor 121 communicates directly with main memory 122 and cache memory 140 via a memory port 103.

Included within the computing device 100 illustrated in FIG. 2 is a system bus 150 that communicates with the following components: a central processing unit 121; a main memory 122; storage memory 128; an input/output (I/O) controller 123; display devices 124A-124N; an installation device 116; and a network interface 118.

In one embodiment, the storage memory 128 includes: an operating system, software routines, and a client agent 120. The I/O controller 123, in some embodiments, is further connected to a keyboard 126, and a pointing device 127. Other embodiments may include an I/O controller 123 connected to more than one input/output device 130A-130N.

FIG. 3 illustrates another embodiment of a computing device 100 that includes a system bus 150 that communicates with a bridge 170 and a first I/O device 130A. The bridge 170 may be in further communication with the main central processing unit 121, where the central processing unit 121 may further communicate with a second I/O device 130B, a main memory 122, and a cache memory 140. Included within the central processing unit 121, are I/O ports 125A-125N, a memory port 103, and a main processor 121.

Embodiments of the computing machine 100 may include a central processing unit 121 characterized by any one of the following component configurations: logic circuits that respond to and process instructions fetched from the main memory unit 122; a microprocessor unit, a microprocessor, a microcontroller, a central processing unit with a single processing core, a central processing unit with two processing cores, a central processing unit with more than one processing core, a programmable logic device, or any other suitable combination of logical circuits.

While FIG. 3 illustrates a computing device 100 that includes a single central processing unit 121, in some embodiments the computing device 100 may include one or more processing units 121. In these embodiments, the computing device 100 may store and execute firmware or other executable instructions that, when executed, direct the one or more processing units 121 to simultaneously execute instructions or to simultaneously execute instructions on a single piece of data.

In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 may include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 may be segmented and assigned to a particular core within the processing unit 121.

In one embodiment, the one or more processing cores or processors in the computing device 100 may each access local memory. In still another embodiment, memory within the computing device 100 may be shared amongst one or more processors or processing cores, while other memory may be accessed by particular processors or subsets of processors.

In embodiments where the computing device 100 includes more than one processing unit, the multiple processing units may be included in a single integrated circuit (IC). These multiple processors, in some embodiments, may be linked together by an internal high speed bus, which may be referred to as an element interconnect bus.

In embodiments where the computing device 100 includes one or more processing units 121, or a processing unit 121 including one or more processing cores, the processors may execute a single instruction simultaneously on multiple pieces of data (SIMD), or in other embodiments may execute multiple instructions simultaneously on multiple pieces of data (MIMD). In some embodiments, the computing device 100 may include any number of SIMD and MIMD processors.

The computing device 100, in some embodiments, may include a graphics processor or a graphics-processing unit. The graphics processing unit may include any combination of software and hardware, and may further input graphics data and graphics instructions, render a graphic from the inputted data and instructions, and output the rendered graphic. In some embodiments, the graphics processing unit may be included within the processing unit 121. In other embodiments, the computing device 100 may include one or more processing units 121, where at least one processing unit 121 is dedicated to processing and rendering graphics.

One embodiment of the computing machine 100 may include a central processing unit 121 that communicates with cache memory 140 via a secondary bus also known as a backside bus, while another embodiment of the computing machine 100 includes a central processing unit 121 that communicates with cache memory via the system bus 150. The local system bus 150 may, in some embodiments, also be used by the central processing unit to communicate with more than one type of I/O device 130A-130N.

In some embodiments, the local system bus 150 may be any one of the following types of buses: a Video Electronics Standards Association Local (VL) bus; an Industry Standard Architecture (ISA) bus; an Extended ISA (EISA) bus; a MicroChannel Architecture (MCA) bus; a Peripheral Component Interconnect (PCI) bus; a PCI-Extended (PCI-X) bus; a PCI-Express (PCIe) bus; or an Accelerated Graphics Port (AGP) bus.

Other embodiments of the computing machine 100 include an I/O device 130A-130N that is a video display 124 that communicates with the central processing unit 121. Still other versions of the computing machine 100 include a processor 121 connected to an I/O device 130A-130N via any suitable connection, such as: HyperTransport, Rapid I/O, or InfiniBand. Further embodiments of the computing machine 100 include a processor 121 that communicates with one I/O device 130A using a local interconnect bus and a second I/O device 130BB using a direct connection.

The computing device 100, in some embodiments, includes a main memory unit 122 and cache memory 140. The cache memory 140 and main memory unit 122 may, and in some embodiments may be any one of the following types of memory: Static Random Access Memory (SRAM), Burst SRAM or SynchBurst SRAM (BSRAM); Dynamic Random Access Memory (DRAM); Fast Page Mode DRAM (FPM DRAM); Enhanced DRAM (EDRAM), Extended Data Output RAM (EDO RAM); Extended Data Output DRAM (EDO DRAM); Burst EDO DRAM (BEDO DRAM); synchronous DRAM (SDRAM); Joint Electron Devices Engineering Council (JEDEC) SRAM; PC100 SDRAM; Double Data Rate SDRAM (DDR SDRAM); Enhanced SDRAM (ESDRAM); SyncLink DRAM (SLDRAM); Ferroelectric RAM (FRAM); memristor based memory; or any other type of memory. Further embodiments include a central processing unit 121 that may access the main memory 122 via: a system bus 150; a memory port 103; or any other connection, bus or port that allows the processor 121 to access memory 122.

One embodiment of the computing device 100 may provide support for any one of the following installation devices 116: a CD-ROM drive, a CD-R/RW drive, a DVD-ROM drive, tape drives of various formats, a universal serial bus (USB) device, Secure Digital card, Preboot Execution Environment (PXE) firmware, a bootable medium, a bootable CD, a hard-drive or any other device suitable for installing applications or software.

Applications may in some embodiments include a client agent 120, or any portion of a client agent 120. The computing device 100 may further include a storage device 128 that may be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a LAN, WAN or the Internet through a variety of connections including, but not limited to, standard telephone lines, LAN or WAN links (e.g., 802.11, T1, T3, 56 kb, X.25), broadband connections (e.g., Integrated Services Digital Network (ISDN), Frame Relay, ATM, Gigabit Ethernet, Ethernet-over-SONET), wireless connections, or some combination of any or all of the above. Connections may also be established using a variety of communication protocols (e.g., TCP/IP, Ethernet, Attached Resource Computer Network (ARCNET), SONET, SDH, Fiber Distributed Data Interface (FDDI), RS232, RS485, IEEE 802.11, IEEE 802.11a/b/g/n, CDMA, GSM, Wi-Fi, WiMax and direct asynchronous connections).

One version of the computing device 100 includes a network interface 118 able to communicate with additional computing devices via any type and/or form of gateway or tunneling protocol such as Secure Socket Layer (SSL) or Transport Layer Security (TLS). Versions of the network interface 118 may comprise any one of: a built-in network adapter; a network interface card; a Personal Computer Memory Card International Association (PCMCIA) network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices.

Some embodiments of the I/O devices 130A-130N may be configured to provide storage or an installation device 116, while others may provide a USE interface for receiving USB storage devices. Still other embodiments include an I/O device 130 that may be a bridge between the system bus 150 and an external communication bus, such as: a USE bus; an RS-232 serial connection; a Small Computer System Interface (SCSI) bus; an IEEE 1394 bus; an Ethernet bus; a Gigabit Ethernet bus; an ATM bus; a High Performance Parallel Interface (HIPPI) bus; a Super HIPPI bus; a SerialPlus bus; a Scalable Coherent Interface (SCI) bus; a FibreChannel bus; or a Serial Attached SCSI (SAS) bus.

In some embodiments, the computing machine 100 may connect to multiple display devices 124A-124N, in other embodiments the computing device 100 may connect to a single display device 124, while in still other embodiments the computing device 100 connects to display devices 124A-124N that are the same type or form of display, or to display devices that are different types or forms. Embodiments of the display devices 124A-124N may be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N. These configurations may include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 may execute any operating system, while in other embodiments the computing machine 100 may execute any of the following operating systems: any embedded operating system; any real-time operating system; any remote operating system; any operating systems for mobile computing devices; or any other operating system.

In still another embodiment, the computing machine 100 may execute multiple operating systems. For example, the computing machine 100 may execute a virtualization platform that may execute or manage a virtual machine executing a first operating system, while the computing machine 100 executes a second operating system different from the first operating system.

The computing machine 100 may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a digital audio player or any other type and/or form of computing, telecommunications or media device that is capable of communication and that has sufficient processor power and memory capacity to perform the methods and systems described herein.

In other embodiments the computing machine 100 may be a mobile device such as any one of the following mobile devices: a cellular telephone or personal digital assistant (PDA); a smart phone; a handheld computing device; any computing device that has different processors, operating systems, and input devices consistent with the device; or any other mobile computing device capable of performing the methods and systems described herein.

In one embodiment, the computing device 100 may be a digital audio player which functions as both a portable media player and as a mass storage device. In some embodiments, the computing device 100 may have different processors, operating systems, and input devices consistent with the device.

In some embodiments, the computing device 100 may comprise a combination of devices, such as a mobile phone combined with a digital audio player or portable media player. In one of these embodiments, the computing device 100 may be a combination digital audio player and mobile phone. In another of these embodiments, the computing device 100 may be a smartphone. In another of these embodiments, the computing device 100 may be a tablet computer.

Although referred to generally, this disclosure is not limited to desktop disk images, and includes other embodiments of images such as server disk images. In some environments for centralized management of desktops, multiple client machines 102 may receive copies of a single "golden master" desktop disk image. In one embodiment, a desktop disk image includes files used to execute an operating system and/or an image of an operating system. In another embodiment, the desktop disk image may include a set of applications and customizations.

In still another embodiment, the desktop disk image represents a working environment for a user. In yet another embodiment, a desktop disk image may also be referred to as a machine disk image. In some embodiments, a copy of the master desktop disk image provided to a user by a client machine 102 may evolve with time, diverging further from the master desktop disk image as each user applies changes to their working environment. For example, changes resulting from modifying settings, adding or deleting information, and installing new applications may result in differences between one copy and another and between one copy and the master desktop disk image.

In some aspects, the present disclosure relates to systems and methods of implementing a provisioned machine on a client device. The provisioned machine may also operate from a local delta disk that persists on the client machine across the boots of the client system. The systems and methods described herein also relate to persisting a delta disk from which a provisioned machine on the client machine operates across a re-boot of the client machine.

A provisioned machine may involve any number of client devices accessing and using the same base disk of a provisioning server across a network. In order for each of the provisioned machines on the clients to execute, each client machine may include a local delta disk residing on a physical disk used by the provisioned machine.

During a preboot of the client machine, a provisioning bootstrap function for prebooting the provisioning machine may read the virtual hard disk (VHD) format differencing disk as a file located on a file system of the physical disk, such as a file located on a new technology file system (NTFS). The bootstrap function may execute in an operating mode of a CPU, such as for example an x86 real-mode. One or more VHD and NTFS stacks may be implemented with the real mode environment enabling the client machine control of the prebooting of the provisioned machine as the client machine boots.

During the boot of the client's operating system, such as the Windows OS, a virtual disk storage controller may enable the physical disk controller of the client to initialize the physical disk first so that the delta disk path chain can be established during the boot time. Initializing the physical disk to establish the delta disk path and enable the provisioned operating system to read from or write to the virtual disk that includes the disk delta. As the user on the client utilizes the functions and/or applications of the provisioned machine, the provisioned machine may operate from the virtual disk which may be composed/combined from disk delta and the base disk on the remote server.

Over time, as the delta disks receives the information and data from the server's base disk, the delta disk may include any functions or acquire any functionality of the server's base disk. In the background or by demand, the delta disk may identify portions of the base disk that are present on the server and absent on the client machine and receive such data from the base disk in order to establish the local copy of all the data stored on the server's base disk. The delta file may be synchronized with the base disk on provisioning server over the network via any protocol, such as the PVS built in protocol.

The delta file, which may also be referred to as VHD differencing file, may be expanded to the maximum specified size of base disk in order to include additional data from the base disk. The delta file may copy data blocks from base to delta if the data does not exist in delta file. For data blocks that do not exist in the base disk, a delta file may be zero-filled. Eventually, the delta disk may become an identical copy of the server's base disk or acquire any essential functionality of the server's base disk enabling the delta disk to provide the client's provisioned machine to operate independent from the server's base disk.

When the user shuts down or restarts the client machine, during the OS shut down, the client machine may shut down the virtual disk before shutting down the physical disk. This order may ensure that the delta disk remains stored on the client's physical disk even once the machine is shut down. In some embodiments, an OS of the client machine, such as the Windows 7/Server 2008 R2 OS, comprises the functionality or knowledge to control and manage the interaction and/or dependency between the physical disk and the virtual disk of the client machine.

As the provisioned machine may transmit to the client's OS the information about the virtual disk, the OS of the client may use this information to ensure that the virtual disk is stored and shut down properly so that the information from the virtual disk is not lost during the course of shut down or reboot. Once the disk delta of the provisioned machine is capable to persist across reboot of the client machine, a synchronized virtual disk back-fill may take place to populate, at a storage block level, from the server base disk blocks of data that are not present in current VHD differencing disk.

Once the disk delta of the provisioned machine is capable to persist across reboot of the client machine, a synchronized virtual disk back-fill may take place to populate, at a storage block level, from the server base disk blocks of data that are not present in current VHD differencing disk.

Figure 4:
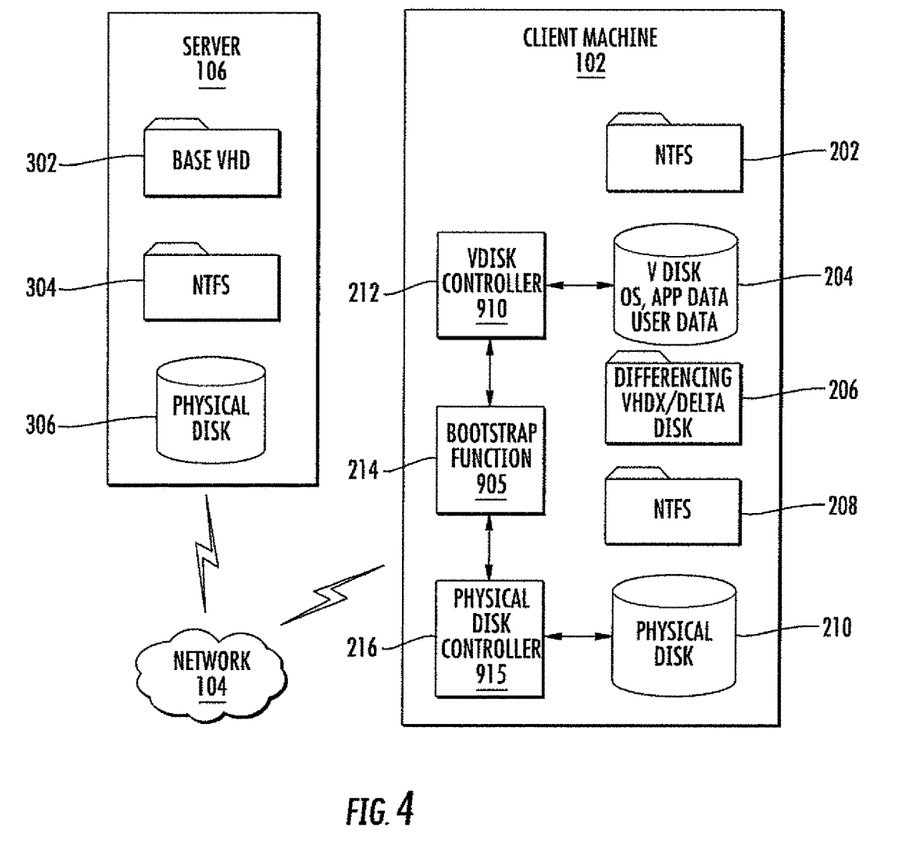
FIG. 4 is a block diagram of a network environment with a server streaming a single virtual disk to a client device.

Referring now to FIG. 4, a server 106 implements a provisioned machine on a client device 102. The server 106 and the client machine 102 may cooperate with one another using Citrix Provisioning Services (PVS), for example. PVS is directed to software-streaming that delivers patches, updates, a virtual disk image and other configuration information to one or more virtual desktop endpoints through a shared desktop image.

In the embodiment illustrated in FIG. 4, a central management console (i.e., PVS server 106) streams a single virtual disk image to a streaming provisioning endpoint (i.e., client machine 102), where the single virtual disk image is based on a virtual disk configuration.

The server 106 communicates with the remote client device 102 via a network 104, such as an intranet or an Internet. The server 106 may comprise a base virtual hard disk (VHD) 302 for servicing any number of provisioned machines, virtual or physical, of any number of clients 102 on the network 104.

In one embodiment, the base VHD 302 is streamed to any number of physical machines and any number of virtual machines. The base VHD 302 of the server 106 may comprise information and data used by the provisioned virtual machines of the clients 102 to run applications or functions on, or via, the client's provisioned machine environment.

The base VHD 302 may execute on the NTFS file system 304 of the physical disk 306 of the server 106. The client 102 may include a physical disk 210 that stores a differencing VHD 206, also referred to as a delta disk, which may execute on the NTFS file system 208 of the physical disk 210 of the client 102. The delta disk 206 may include a virtual disk 202, also referred to as a vDisk, which may also include a NTFS file system 202 of its own. The NTFS 202 of the virtual disk 204 from the delta disk may provide the environment within which the user of the client 102 executes the applications and services that may also be provided by the base VHD 302 of the server 106.

The NTFS, or the NTFS layer may comprise any file system or an organized collection of data, data architecture or a database used by any operating system described herein. The NTFS may operate on any network device, including a client 102 or a server 106. The NTFS may comprise or include a functionality of any software, hardware or a combination of software and hardware, programs, executables, functions, instructions, data or libraries.

The NTFS may operate on a physical disk or on a virtual disk. The NTFS layer may provide a system of storing data and files on the hard disks or memory of any device described herein. The NTFS may be a hierarchical or a non-hierarchical file system and may be configured to operate on any operating system (OS) referenced herein.

In one embodiment, the NTFS layer corresponds to the NTFS file system format used by a Windows 7 operating system. In other embodiments, the NTFS may include or comprise the functionality of any other file system for any other OS. The NTFS may be or include the functionality of a file allocation table (FAT) filing system, including the FAT 32 or FAT 64, a Hierarchical File System, any filing system for organizing data for a Mac OS or Mac OS extended. The NTFS may comprise an environment within which applications or services execute or operate. The NTFS may also include any functionality enabling an operating system of a physical machine or a virtual machine, to execute functions or applications used by the user.

A base VHS 302, or a base disk of the server 106, may also include any portion of a physical disk 306 of the server 106 disk from which a base disk image may be made. The base disk of a server 106 may comprise a virtual disk located on the NTFS 304 of the physical disk 306 of the server 106. The base disk may comprise or include a functionality of any software, hardware or a combination of software and hardware, programs, executables, functions, instructions, data or libraries.

The base disk 302 may include files, programs, instructions, applications or procedures needed or used to operate any application or a service. The base disk 302 may comprise any functionality to enable the operation of a provisioned machine executing on a client 102.

The base disk image may comprise an identical copy of the whole base disk or any portion of the base disk 302. The base disk 302 may comprise any functionality of a base disk image. In addition, the base VHD may include a base disk image to be used by any number of clients 102 or any number of base disk images for usage by any number of clients. A base disk VHD 302 may comprise any additional environment, functions or data for implementing any of the functions, services or applications used by the client 102, including the applications, services or functions described herein.

A base disk VHD 302 may also include a functionality, programs or features for transmitting to a virtual disk 202 of a client 102 any data, blocks of data or portions of the base disk in order to populate the virtual disk 202 of the client 102 with data or information stored in the base disk. The single virtual disk 202 may include the operating system (OS), applications data (apps) and user setting data, for example.

A differencing VHD 206, or delta disk of the client 102, may be any type and form of a virtual disk described herein. A delta disk 206 may comprise or include a functionality of any software, hardware or a combination of software and hardware, programs, executables, functions, instructions, data or libraries. A delta disk 206 may comprise a copy of a whole base disk 302 or any portion of a base disk 302 or any portion of a base disk image. A delta disk 206 may comprise any type and form of a base disk image or any functionality of a base disk image.

The delta disk 206 may also include any type and form of a delta disk, an initial virtual disk image, a modified disk image, a second delta disk and a final disk image. A delta disk 206 may be stored in and operate on the NTFS 208 of a physical device 210 of a client 102. The delta disk 206 may comprise or provide a copy of a virtual disk used by the provisioned machine executing on the client 102.

A bootstrap function 214 may comprise any type and form of a function, program or a procedure for controlling or managing a pre-booting process or booting process for starting up the client machine 102. Bootstrap function 214 may also comprise any type and form of a function, program or a procedure for controlling or managing the procedure or process of shutting down of the client machine 102, particularly the order of shutting down the virtual disk 204 and the physical disk 210.

The bootstrap function 214 may comprise any software, hardware or a combination of software and hardware, programs, functions, executables, instructions, data or libraries. The bootstrap function 214 may execute on an x86 real mode. The bootstrap function 214 may comprise the functionality for reading the differencing disk or the delta disk 206 as a file located on the NTFS 208 of the physical disk 210. The bootstrap function 214 may comprise the functionality to initiate or activate the virtual disk 204 from the delta disk 206.

The bootstrap function 214 may include any booting application, boot-up or boot function or procedure described herein. In addition, the bootstrap function 214 may comprise a program for activating programs controlling and managing the operation of the client machine 102. The bootstrap function 214 may comprise a program, such as a BIOS or UEFI, that initializes and tests basic requirements of hardware, memory or other subcomponents and devices of the client 102.

The bootstrap function 214 may comprise a functionality for initializing and loading an operating system of the client 102, including the operating system of a physical device 210 and the operating system of the virtual disk 204 of the client 102. The bootstrap function 214 may comprise the functionality for identifying a delta disk 206 on the client 102 during the boot-up of the client 102. The bootstrap function 214 may include the functionality for initializing the delta disk 206 and/or starting up the virtual disk 204 during the boot up of the client 102.

A virtual disk controller 216 may include any type and form of a function or controller for controlling or managing the virtual disk 204 of the client 102. The virtual disk controller 212 may comprise any software, hardware or a combination of software and hardware, programs, functions, executables, instructions, data or libraries.

The virtual disk controller 212 may include any functionality for starting up the virtual disk 204 or shutting down the virtual disk. The virtual disk controller 212 may start up the virtual disk 204 during the boot up of the client 102 and may shut down the virtual disk during the shutdown of the client. The virtual disk controller 212 may include any functionality for operating responsive to commands or instructions of the bootstrap function 214.

For example, the virtual disk controller 212 may initiate and set up the virtual disk 204 of the delta disk 206 of the client 102 responsive to an instruction from the bootstrap function 214 during the start up or boot up of the client 102. Similarly, the virtual disk controller 212 may shut down the virtual disk 204 during the shutdown of the client 102 in response to an instruction from the bootstrap function 214.

The virtual disk controller 214 may also include the functionality for determining data or portions of data that are present at the base disk 302 of the server 106 and not present at the delta disk 206 of the client 102 and acquiring such data from the base disk 302 of the server 106. The virtual disk controller 212 may comprise the functionality to request from the base disk 302 blocks of data not present on the delta disk 206 and populate the delta disk with the data received.

The virtual disk controller 212 may comprise the functionality for establishing a background connection with the base disk 302 of the server 106 and keep synchronizing the delta disk 206 with the base disk 302 until the delta disk includes all the data of the base disk of the server 106.

The physical disk controller 216 may include any type and form of a function or controller for controlling or managing the physical disk 210 of the client 102. The physical disk controller 216 may comprise any software, hardware or a combination of software and hardware, programs, functions, executables, instructions, data or libraries.

The physical disk controller 216 may include any functionality for starting up the physical disk 210 or shutting down the physical disk. The physical disk controller 216 may start up the physical disk 210 during the boot up of the client 102 and may shut down the physical disk during the shutdown of the client 102.

The physical disk controller 216 may include any functionality for operating responsive to commands or instructions of the bootstrap function 214. For example, the physical disk controller 216 may initiate and set up the physical of the delta disk 206 of the client 102 responsive to an instruction from the bootstrap function 214 during the start up or boot up of the client 102. Similarly, the physical disk controller 216 may shut down the physical disk 210 during the shutdown of the client 102 in response to an instruction from the bootstrap function 214, Referring now to FIG. 5, the central management console (i.e., PVS server 106) as illustrated in FIG. 4 is configured to stream multiple virtual disk images to the provisioning endpoint (i.e., client machine 102). As will be discussed in greater detail, a remote plug-and-play mechanism is provided to add and remove virtual disks to a provisioned machine without remote end-point interaction and without rebooting the machine.

Figure 5:
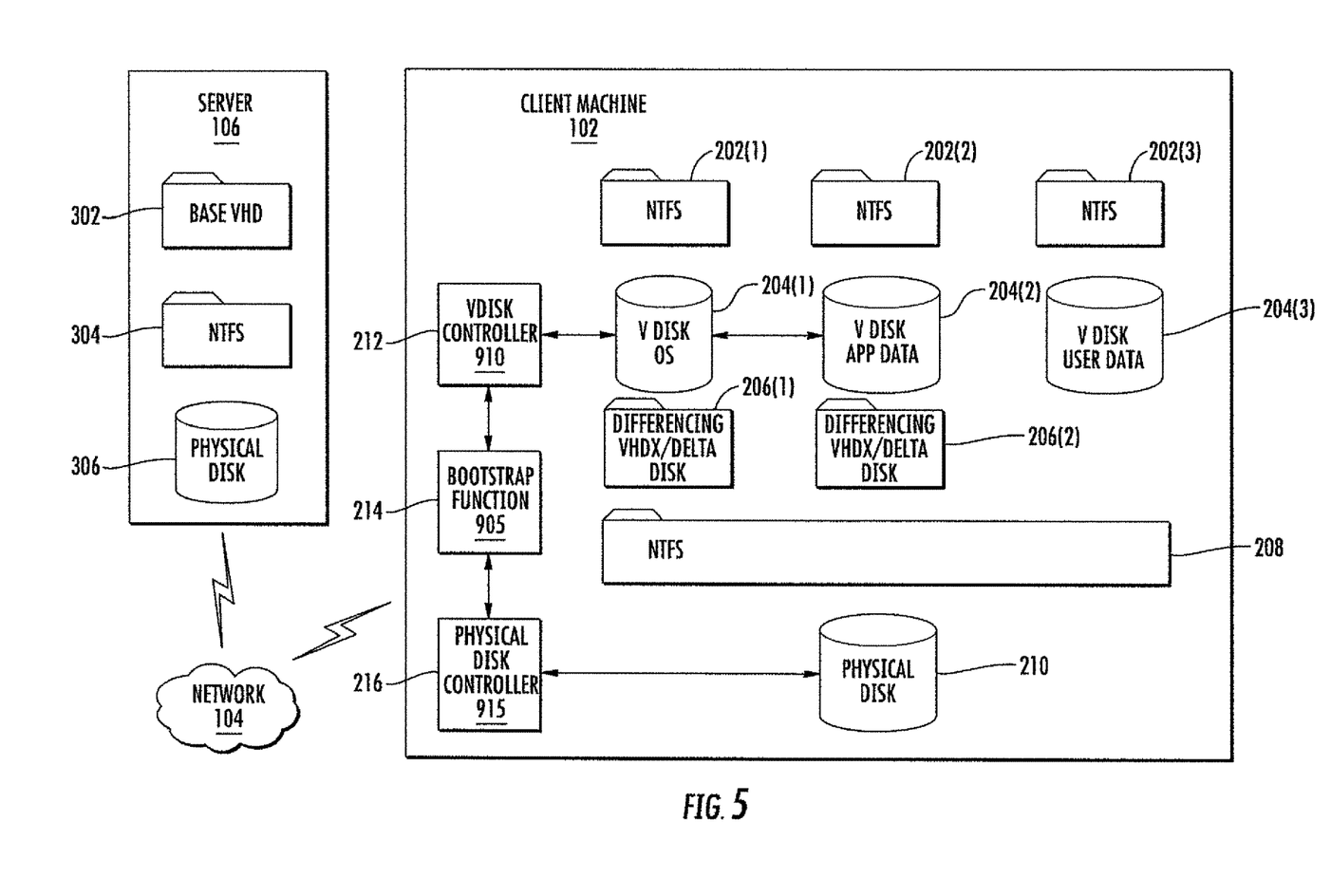
FIG. 5 is a block diagram of the network environment illustrated in FIG. 4 with the server streaming multiple virtual disks to the client device.

When multiple virtual disks are streamed to the client device 102, this advantageously allows the virtual disks to be used for different purposes. For example, instead of having the operating system, the application data and user data all in the same virtual disk 204 as in FIG. 4, now separate virtual disks 204(1), 204(2), 204(3) may be provided for each of these areas. Even though the illustrated example shows three virtual disks, the remote plug-and-play mechanism is not limited to any particular number of virtual disks. Additional virtual disks may be added, and existing virtual disks may be removed when needed.

The client device 102 includes at least one memory 122, 140 and a processor 121 cooperating therewith to boot the client device and connect to a provisioning server 106 via a network 104. The client device 102 receives a streaming virtual disk image from the provisioning server 106 based on a virtual disk configuration. The client device 102 may then receive a virtual disk change notification from the provisioning server 106. The client device 102 determines changes to the virtual disk configuration based on the virtual disk change notification, and cooperates with the provisioning server to change the streaming virtual disk image based on the determined changes to the virtual disk configuration and without rebooting the client device 102.

One aspect is directed to the virtual disk configuration including at least one virtual disk 204(1), and the determined changes to the virtual disk configuration may comprise adding at least one additional virtual disk 204(2), 204(3).

Another aspect is directed to the virtual disk configuration including a plurality of virtual disks, and the determined changes to the virtual disk configuration may comprise removing one of the plurality of virtual disks.

Multiple virtual disks may be streamed to the client device firmware 102 prior to the client device is booted. In this scenario, the client device 102 needs to know which virtual disk has the operating system. The client device 102 is a UEFI machine, for example, and the UEFI machine PXE boots to load a (Citrix) Network Boot Program (NBP) from the network. The UEFI PXE utilizes DHCP to retrieve an IP address, contact the PXE server to retrieve the network boot program filename, and communicates with TFTP to download the network boot program.

The UEFI loader passes control to the network boot program and the network boot program starts to run. The network boot program initiates a protocol handshake with the provisioning server 106 to retrieve multiple virtual disk parameters. The network boot program creates an ACPI parameter table containing the multiple virtual disk parameters.

The network boot program registers a UEFI BlockIO protocol for each virtual disk to anticipate the UEFI loader to issue blockIO read/write for the next boot loader, such as for operating system. The network boot program creates the ACPI parameter table containing the multiple virtual disk parameters.

The network boot program enumerates all blockIO protocol belonging to the virtual disks, and loads the next boot loader (e.g., Windows) in the operating system virtual disk 204(1), and transfers control to the next boot loader. The Windows operating system starts to run, and a PVS virtual storage miniport driver retrieves virtual disk parameters from the ACPI parameter table, and presents the multiple virtual disks to the client device 102 to enable multiple virtual disk streaming.

As discussed in the background, a virtual disk in a virtual machine may be enumerated with the assistance of a hypervisor. A virtual disk can surface to a virtual machine through a hypervisor management backend. However, there are several shortcomings. One shortcoming is that remotely adding and removing a virtual disk does not apply to a physical machine. Another shortcoming is that the virtual disk file needs to be distributed completely in hypervisor storage before the virtual disk can be presented to the virtual machine, which could incur a long wait time.

In sharp contrast, the remote plug-and-play mechanism allows virtual disks to be added and removed on a live running machine, both physical and virtual machines, without the requirement of a hypervisor and without user intervention. The remote plug-and-play mechanism delivers multiple virtual disks without long wait times and without file copying.

With the remote plug-and-play mechanism permitting multiple virtual disks to be streamed concurrently, this advantageously allows an operating system virtual disk 204(1) and an application data virtual disk 204(2) to be managed separately, for example.

Typically, an administrator is limited to a single golden image containing both the operating system and the application data. This presented challenges when the operating system and the application data had different update schedules. The multiple virtual disks provide a flexible way in managing different virtual disks update cycles.

The remote plug-and-play mechanism may advantageously be combined with Citrix AppDisk technology, for example. An AppDisk virtual disk can be streamed from a provisioning server 106 instead of locked down to a particular local storage at the client device 102.

The remote endpoint 102 has an agent listener 120 waiting for the virtual disk change notification via the streaming network 104. When a virtual disk change notification is received, the endpoint 102 compares a current enumerated virtual disk versus the new configuration to determine how many virtual disks to add or remove.

When a new virtual disk is added, the agent listener 120 communicates with the virtual disk controller 212 to plug in a new virtual disk with the instructions to connect to the streaming server 106.

When a virtual disk is selected for removal, the agent listener 120 communicates with the virtual disk controller 212 to unplug the virtual disk. The virtual disk controller 212 in turns iterates through all the volume mounted on top of this virtual disk and dismounts them first before finally removing the virtual disk instance.

Figure 6:
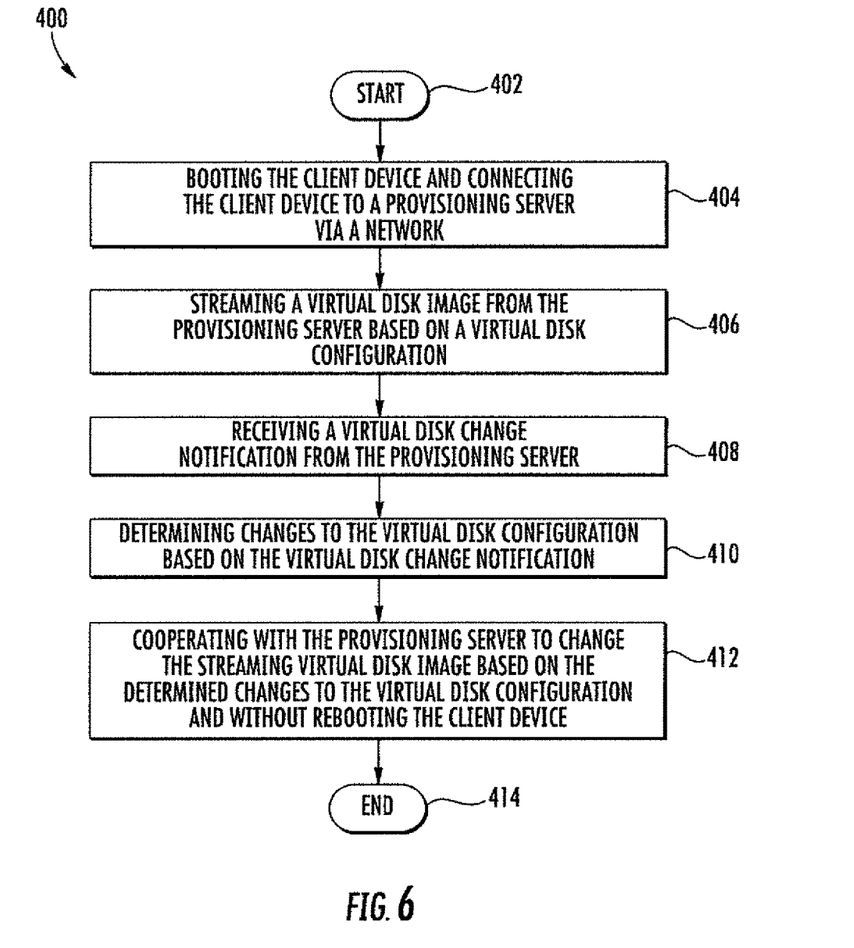
FIG. 6 is a flowchart illustrating a method for operating the client device illustrated in FIG. 5.

Another aspect is directed to a method for operating a client device 102 based on the above discussed remote plug-and-play mechanism. Referring to the flowchart 400 in FIG. 6, the method comprises from the start (Block 402), booting the client device 102 and connecting the client device to a provisioning server 106 via a network 104 at Block 404. A virtual disk image is streamed from the provisioning server 106 based on a virtual disk configuration at Block 406. A virtual disk change notification is received from the provisioning server 106 at Block 408. Changes to the virtual disk configuration based on the virtual disk change notification are determined at Block 410. The client device 102 cooperates with the provisioning server 106 to change the streaming virtual disk image based on the determined changes to the virtual disk configuration and without rebooting the client device at Block 412. The method ends at Block 414.

Figure 7:
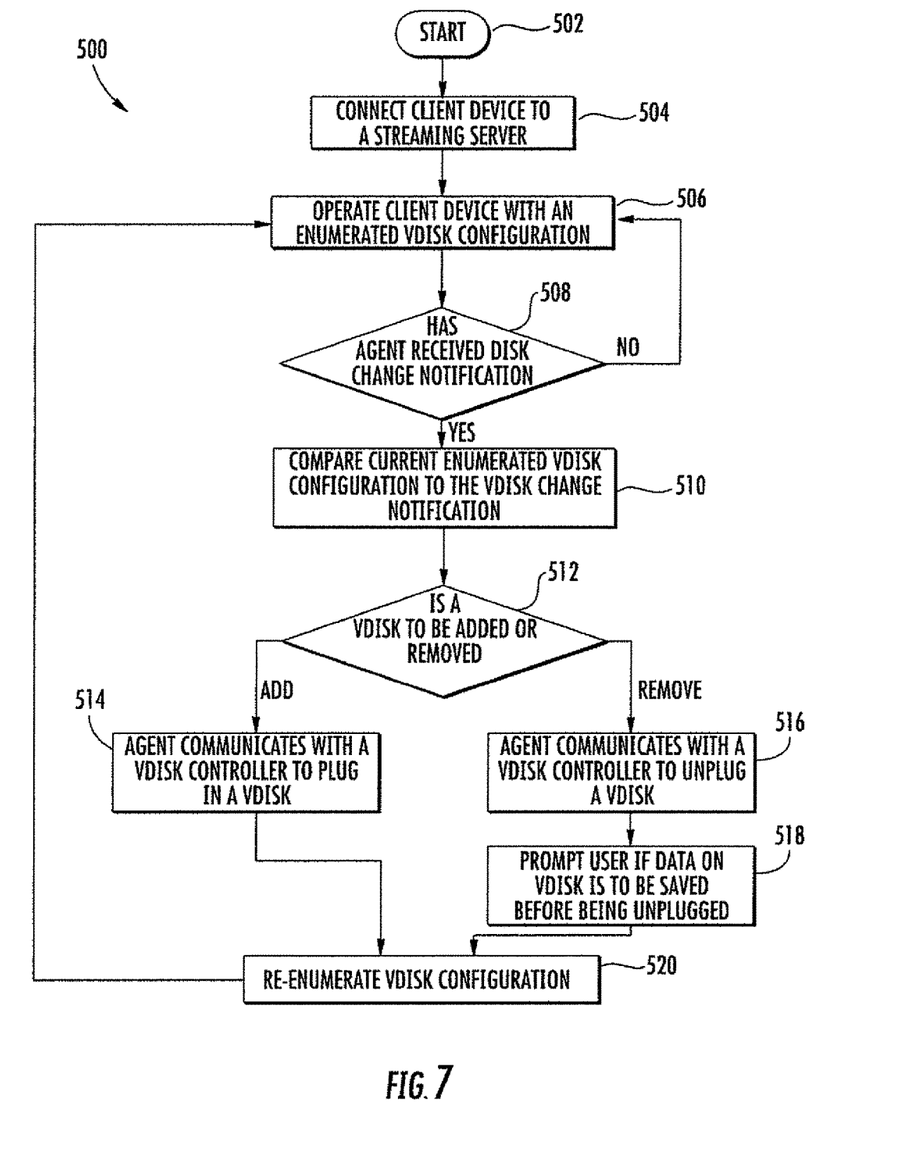
FIG. 7 is a flowchart illustrating a more detailed method for operating the client device illustrated in FIG. 5.

Referring now to FIG. 7, a more detailed flowchart 500 for operating the client device 102 will be discussed. From the start (Block 502), the client device 102 is connected to a streaming server 106 via a network 104 at Block 504. The client device 102 is operated with an enumerated virtual disk configuration at Block 506. The enumerated virtual disk configuration corresponds to a single virtual disk configuration or a multiple virtual disk configuration.

At Block 508, a determination is made on whether or not a virtual disk change notification has been received. If a virtual disk change notification has not been received, then the flowchart 500 loops back to Block 506. If a virtual disk change notification has been received, then the current enumerated virtual disk configuration is compared to the virtual disk change notification at Block 510.

A determination is made at Block 512 if a virtual disk is to be added or removed. If a virtual disk is to be added, a client agent 120 communicates with a virtual disk controller 212 to plug in a new virtual disk at Block 514. If a virtual disk is to be removed, then the client agent 120 communicates with the virtual disk controller 212 to unplug a virtual disk at Block 516. A user may be prompted at Block 518 if the data on the virtual disk is to be saved before being unplugged.

The enumerated virtual disk configuration is re-enumerated at Block 520 after a virtual disk has been added or after a virtual disk has been removed. The flowchart 500 now loops to Block 506.

Yet another aspect is directed to a non-transitory computer readable medium having a plurality of computer executable instructions for causing a client device 102 to perform steps comprising booting the client device and connect to a provisioning server 106 via a network 104; receiving a streaming virtual disk image from the provisioning server based on a virtual disk configuration; receiving a virtual disk change notification from the provisioning server; determining changes to the virtual disk configuration based on the virtual disk change notification; and cooperating with the provisioning server to change the streaming virtual disk image based on the determined changes to the virtual disk configuration and without rebooting the client device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

That which is claimed:

1. A client device comprising:
at least one memory and a processor cooperating therewith to
boot the client device and connect to a provisioning server via a network,
receive a streaming virtual disk image from the provisioning server based on a virtual disk configuration, with the streaming virtual disk image corresponding to a current enumerated virtual disk,
receive a virtual disk change notification from the provisioning server that provides a new configuration for the current enumerated virtual disk
determine changes to the current enumerated virtual disk based on the virtual disk change notification by comparing the current enumerated virtual disk to the new configuration, and
cooperate with the provisioning server to change the streaming virtual disk image based on the determined changes to the current enumerated virtual disk and without rebooting the client device.

2. The client device according to claim 1 wherein the determined changes to the virtual disk configuration provides a plurality of virtual disks.

3. The client device according to claim 2 wherein the plurality of virtual disks comprises at least one of an operating system virtual disk, an applications data virtual disk, and a user data virtual disk.

4. The client device according to claim 1 wherein the virtual disk configuration comprises at least one virtual disk, and wherein the determined changes to the virtual disk configuration comprises adding an additional virtual disk.

5. The client device according to claim 1 wherein the virtual disk configuration comprises a plurality of virtual disks, and wherein the determined changes to the virtual disk configuration comprises removing one of the plurality of virtual disks.

6. The client device according to claim 1 wherein the virtual disk configuration comprises a plurality of virtual disks, with the plurality of virtual disks being concurrently streamed.

7. The client device according to claim 1 wherein said at least one memory and said processor cooperate with the provisioning server without using a hypervisor.

8. The client device according to claim 1 wherein said at least one memory and said processor cooperate with the provisioning server without user intervention.

9. A method for operating a client device comprising:
booting the client device and connecting the client device to a provisioning server via a network;
streaming a virtual disk image from the provisioning server based on a virtual disk configuration, with the streaming virtual disk image corresponding to a current enumerated virtual disk;
receiving a virtual disk change notification from the provisioning server, with the virtual disk change notification providing a new configuration for the current enumerated virtual disk;
determining changes to the current enumerated virtual disk based on the virtual disk change notification by comparing the current enumerated virtual disk to the new configuration; and
cooperating with the provisioning server to change the streaming virtual disk image based on the determined changes to the current enumerated virtual disk and without rebooting the client device.

10. The method according to claim 9 wherein the determined changes to the virtual disk configuration provides a plurality of virtual disks.

11. The method according to claim 10 wherein the plurality of virtual disks comprises at least one of an operating system virtual disk, an applications data virtual disk, and a user data virtual disk.

12. The method according to claim 9 wherein the virtual disk configuration comprises at least one virtual disk, and wherein the determined changes to the virtual disk configuration comprises adding an additional virtual disk.

13. The method according to claim 9 wherein the virtual disk configuration comprises a plurality of virtual disks, and wherein the determined changes to the virtual disk configuration comprises removing one of the plurality of virtual disks.

14. The method according to claim 9 wherein the virtual disk configuration comprises a plurality of virtual disks, with the plurality of virtual disks being concurrently streamed.

15. The method according to claim 9 wherein the client device cooperates with the provisioning server without using a hypervisor.

16. The method according to claim 9 wherein the client device cooperates with the provisioning server without user intervention.

17. A non-transitory computer Readable medium having a plurality of computer executable instructions for causing a client device to perform steps comprising:
booting the client device and connect to a provisioning server via a network;
receiving a streaming virtual disk image from the provisioning server based on a virtual disk configuration, with the streaming virtual disk image corresponding to a current enumerated virtual disk;
receiving a virtual disk change notification from the provisioning server, with the virtual disk change notification providing a new configuration for the current enumerated virtual disk;
determining changes to the current enumerated virtual disk based on the virtual disk change notification by comparing the current enumerated virtual disk to the new configuration; and
cooperating with the provisioning server to change the streaming virtual disk image based on the determined changes to the current enumerated virtual disk and without rebooting the client device.

18. The non-transitory computer readable medium according to claim 17 wherein the determined changes to the virtual disk configuration provides a plurality of virtual disks.

19. The non-transitory computer readable medium according to claim 18 wherein the plurality of virtual disks comprises at least one of an operating system virtual disk, an applications data virtual disk, and a user data virtual disk.

20. The non-transitory computer readable medium according to claim 17 wherein the virtual disk configuration comprises at least one virtual disk, and wherein the determined changes to the virtual disk configuration comprises adding an additional virtual disk.

21. The non-transitory computer readable medium according to claim 17 wherein the virtual disk configuration comprises a plurality of virtual disks, and wherein the determined changes to the virtual disk configuration comprises removing one of the plurality of virtual disks.

* * * * *